United States Patent
Hackländer et al.

(10) Patent No.: US 8,948,902 B2
(45) Date of Patent: Feb. 3, 2015

(54) METHOD FOR OPERATION OF AN AUTOMATION DEVICE AND APPARATUS FOR CARRYING OUT THE METHOD

(75) Inventors: Frank Hackländer, Stuttgart (DE); Volker Maier, Ostfildern (DE); Dieter Schneider, Backnang (DE)

(73) Assignee: Siemens Aktiengesellschaft, München (DE)

( * ) Notice: Subject to any disclaimer, the term of this patent is extended or adjusted under 35 U.S.C. 154(b) by 1981 days.

(21) Appl. No.: 11/663,364

(22) PCT Filed: Sep. 16, 2005

(86) PCT No.: PCT/EP2005/054612
§ 371 (c)(1),
(2), (4) Date: Mar. 20, 2007

(87) PCT Pub. No.: WO2006/032632
PCT Pub. Date: Mar. 30, 2006

(65) Prior Publication Data
US 2008/0275589 A1    Nov. 6, 2008

(30) Foreign Application Priority Data

Sep. 22, 2004  (DE) .......................... 10 2004 045 933

(51) Int. Cl.
*G05B 19/414*    (2006.01)

(52) U.S. Cl.
CPC .... *G05B 19/414* (2013.01); *G05B 2219/33225* (2013.01); *G05B 2219/34303* (2013.01); *G05B 2219/35311* (2013.01)
USPC ....................................................... 700/159

(58) Field of Classification Search
USPC ............................. 700/159, 181, 86; 709/201
See application file for complete search history.

(56) References Cited

U.S. PATENT DOCUMENTS

| | | | |
|---|---|---|---|
| 6,006,141 A * | 12/1999 | Yoneda et al. ................ | 700/169 |
| 6,311,101 B1 | 10/2001 | Kastner | |
| 6,640,140 B1 | 10/2003 | Lindner et al. | |
| 6,930,461 B2 * | 8/2005 | Rutkowski .................... | 318/567 |
| 6,988,019 B2 * | 1/2006 | Ould et al. .................... | 700/181 |
| 2003/0014149 A1 * | 1/2003 | Kreidler et al. ............... | 700/169 |
| 2005/0138373 A1 * | 6/2005 | Clark et al. ................... | 713/166 |
| 2007/0005178 A1 * | 1/2007 | Prestidge et al. ............. | 700/186 |

FOREIGN PATENT DOCUMENTS

| | | |
|---|---|---|
| DE | 19621384 A1 | 11/1996 |
| DE | 101 52 765 A1 | 5/2003 |
| EP | 0 766 156 A1 | 4/1997 |
| EP | 1 215 549 A2 | 6/2002 |
| EP | 1 282 020 A2 | 2/2003 |

(Continued)

*Primary Examiner* — Sean Shechtman
*Assistant Examiner* — Steven Garland
(74) *Attorney, Agent, or Firm* — Henry M. Feiereisen LLC

(57) ABSTRACT

There is described a method for operating an automation device and/or a programming system. When the automation device is in operation, a communication connection between: a) the automation device and a telecommunication device and/or b) the automation device and the internet and/or intranet can be established. The automation device is controlled and/or regulated by means of a program. The communication connection is used by means of at least one instruction in the program for the data communication during the execution of the program. It is also possible to establish a communication, in particular, within the teleprogram.

11 Claims, 2 Drawing Sheets

(56) References Cited

FOREIGN PATENT DOCUMENTS

| | | |
|---|---|---|
| JP | 08328636 A | 12/1996 |
| JP | 11058276 A | 3/1999 |
| JP | 2002312011 A | 10/2002 |
| JP | 2004-25428 * | 1/2004 |
| JP | 2004025428 A | 1/2004 |
| JP | 2004038855 A | 2/2004 |
| JP | 2004227047 A | 8/2004 |

* cited by examiner

METHOD FOR OPERATION OF AN AUTOMATION DEVICE AND APPARATUS FOR CARRYING OUT THE METHOD

CROSS REFERENCE TO RELATED APPLICATIONS

This application is the US National Stage of International Application No. PCT/EP2005/054612, filed Sep. 16, 2005 and claims the benefit thereof. The International Application claims the benefits of German application No. 10 2004 045 933.9 DE filed Sep. 22, 2004, both of the applications are incorporated by reference herein in their entirety.

FIELD OF INVENTION

The invention relates to a method for operation of an automation device, to a programming system for creation of a user program for an automation device, and to a program product.

BACKGROUND OF INVENTION

In the case of machine tools and/or production machines, in which case the expression production machines should also be understood as meaning automatic handling machines, shafts and/or spindles, for example, are moved within a production process in order to process a workpiece. The shafts and/or spindles which in this case, by way of example, describe a relative movement between a tool and a workpiece, are referred to as so-called processing units. The shafts and/or spindles are associated with a so-called channel for processing. The movement orders to the processing unit are predetermined and described in the channel, in the form of a part program. The part program is transferred within the machine's numerical control to an interpreter, which converts the part program to an appropriate machine code.

EP 1 282 020 A2 discloses a method for storage of data for an industrial controller. The industrial controller provides open-loop and/or closed-loop control for automation apparatuses, in particular in a factory environment.

Specifically defined routines are stored in a program memory for data management and carry out individual tasks in conjunction with file handling. A higher-level program can call up these routines. The higher-level program may include instructions by means of which an Internet link is used in order to interchange data with external units. This higher-level program is independent of the actual control tasks of the industrial controller.

EP 0 766 156 A1 discloses a programmable logic controller which receives sensor signals, for example from an appliance to be controlled, processes the data, and emits actuator signals. At a separate time from these processes, data communication can take place with external subscribers in order to interchange data, such as parameters that can be used.

SUMMARY OF INVENTION

An object of the invention is to extend the communication capabilities of an automation device.

In a method for operation of an automation device, a communication link can be set up between the automation device and a telecommunication device, and/or between the automation device and an Internet and/or an Intranet. The automation device is for example an NC control (NC: numerical control), a CNC control (CNC: computer numerical control), a PLC control (programmable logic control), a converter with closed-loop or open-loop control, or the like. Automation devices such as these are, for example, part of a machine tool and/or production machine, or of an automatic handling machine. The automation device can be subjected to open-loop and/or closed-loop control by, means of a part program. While the part program is running, the communication link is used for data communication by means of at least one instruction within the part program. The communication link is a link between the automation device and a further telecommunication device, or an Internet and/or Intranet. This link can advantageously be set up directly from the part program for the automation device. Since a direct link is set up, it is possible to have the capability to set up a data link from the part program, which, for example, is intended for movement of shafts, with data being transmitted which is relevant for the movement of, for example, one shaft.

In order to improve the productivity, machine tools or production machines have a plurality of processing units, which can be moved simultaneously. Machines such as these are referred to as multichannel machines. In these machines, a plurality of relative movements are defined between a workpiece or workpieces and/or a tool or tools in autonomous part programs for simultaneous processing, and these part programs are interpreted and checked simultaneously by a plurality of channels. Each channel in this case has its own dedicated associated part program.

In this case, by way of example, the part program comprises standard ASCII source code in accordance with DIN 66025/ISO, possibly as well as upgrades from additional manufacturers, and/or machine-specific upgrades. The part programs are normally displayed and processed in an ASCII representation by means of an editor, in particular a text editor. Graphics-based editing of the part program is also possible. This can be used on a job-oriented basis to create part programs within a so-called job-oriented step representation, and these are displayed to an operator. A step representation allows easier programming and control of the machine as a result of the structured view and processing capability of the individual part programs.

The creation, simulation and testing of part programs can be carried out in widely differing systems and environments. For example, the part program, or in the case of multichannel machines the part programs, is or are first of all created or programmed, the individual programs are then simulated and tested in a different system environment, and the machine is then started up.

In the case of CNC-controlled machines, for example, a workpiece is either coded directly or the workpiece is first of all modeled by means of a CAD system, and is then converted to an equivalent CNC part program. The CNC part program is then loaded in a CNC controller, and the processing machine is controlled in accordance with the CNC program.

In a method for operation of an automation device, with the automation device being, for example, at least a part of a tool and/or of a production machine, the automation device is subjected to open-loop and/or closed-loop control by means of a program. The program that is used for this purpose operates autonomously. This means that the program for the automation device can access only data for the automation device itself, and/or data for other automation devices. This restricts the reception and transmission of the data required for the automation device.

The part program is used in particular for programming of shaft movements.

One possible application for the invention is, for example, simulation of program instructions.

If, for example, a workpiece which is being manufactured using a CNC program on a machine tool is within the desired manufacturing tolerances of an ideal workpiece, then there are no problems. If, in contrast, the manufactured workpiece does not meet the stated requirements, then this results in an optimization requirement to modify the CNC program in such a manner that a correct workpiece can be manufactured. It is admittedly possible to change individual processing instructions and/or individual operating parameters of the processing machine successively to manufacture a new workpiece and then to check this workpiece which has been manufactured once again. However, this procedure is highly tedious and, furthermore, it is costly, and is intensive in terms of material and time. This is also particularly true because it is often not known where the cause for the discrepancy in the actually manufactured workpiece from the desired workpiece should be looked for. For this reason, increasing emphasis is now being placed on the approach of simulating such mechatronic systems, such as industrial processing machines. However, a large amount of computation power is required in order to allow analysis of the result of a simulation such as this. This is necessary in particular for visualization. Visualization is of major importance, in particular, as well because, inter alia, the visualization can be used to assess a plurality of different workpiece contours calculated by the simulation system, or else discrepancies between the actually manufactured workpiece and the desired workpiece. A simulation such as this can be carried out by means of an instruction according to the invention for use of a communication link. This makes it possible within a programmed user program to send data relating to the simulation to a powerful simulation computer, and to receive simulation transmission data from this computer again. A simulated virtual workpiece such as this can be used for virtual processing, allowing monitoring of the programmed user program. There is therefore, for example, no need to actually produce a workpiece. In principle, the processing machine need not actually be present as such. The number of prototypes can be reduced to a major extent, thus saving costs, by a simulation and virtual manufacture.

The simulation relates, for example, to the entire program and/or to only part of the program. The simulation can also be used for collision monitoring. For example, in one embodiment, it is possible for a first subsequent section of the program to be simulated on the actual automation device while running the program for operation of at least one automation device. If the simulation leads to a positive result (that is to say no collision), then the simulated section of the program is released to be run in reality. The data required for the simulation, for example data from previous sections of the program that have actually been run, is transmitted via the communication link to a simulation device. Data can be transmitted back from this simulation device to the automation device.

By way of example, the automation device is a machine tool or else a production machine. Use of the data link makes it possible to move computation-intensive tasks. In this case, the computation-intensive tasks relate, for example, not just to simulations but also to further computation-intensive tasks which are required to run the program in reality.

In a further advantageous refinement of the method, the part program is programmed by means of an engineering program. The process of programming the part program itself, for example the NC or CNC program or the part program for a PLC (programmable logic controller) therefore provides the capability to initialize a call of a communication link between the automation device and a telecommunication device, or an Internet or else an Intranet. The communication link is set up automatically during the running of the part program. The automatic setting up process by the part program can also be made dependent on conditions which can be checked automatically.

As already described above, the part program is programmed in particular as a movement control program or as an NC program. Particularly in the case of programs such as these, it is not possible at the moment to set up a communication link which is aimed directly at external systems for data processing, from the program. One such external system is, for example, a server.

In a further advantageous refinement, the instruction for data communication is supplied with parameters, by means of which the type of data communication is determined. Parameters such as these are, for example, a telephone number for sending an SMS or an MMS (multi-media service) or for sending a fax. A further parameter would, for example, also be an e-mail address, a web address, an address for an FTP server or the like. SMS, MMS, e-mail are examples of different types of data communication.

In a further advantageous refinement, the instruction for use of the communication link is transmitted to a communication means, and is carried out by the communication means. This is the case, for example, when a plurality of automation devices have joint access to a communication means, for example to a server, and each individually use it to set up the communication link.

In a further advantageous refinement, a time-sharing method, for example, can be used not only for single use but also for joint simultaneous use.

The object of the invention is also achieved by means of a programming system for creation of a user program for an automation device. The user program has instructions, in which case at least one instruction for possible integration in the user program is produced in the programming system, and serves for use of a communication link between the automation device and a telecommunication device, and/or the automation device and an Internet or Intranet. The invention also relates to a program product for an automation device, which product contains code sections by means of which the methods as described above can be carried out on an automation device.

The invention can advantageously be implemented in the form of a computer program product which can be loaded directly into an internal memory in a digital computer and has software sections by means of which the method steps are carried out according to the embodiment described above when the program product is run on the computer or some other data-processing device.

The invention also relates to a programming system, in particular for universal movement control with an engineering and a run-time system, which functionally intrinsically combines the traditional tasks of a programmable logic controller and numerical control.

According to the invention, an automation device can be connected via a suitable data link (for example WAN Wireless Area Network) to an Internet server or a telecommunication server. This link may exist permanently, or else only at times.

A user interface of the automation device has, for example, an ITS command added to it. The abbreviation ITS in this case is short for Internet or Telecommunications Service and is chosen freely as an expression. The selected expression is used to illustrate the function of the command. This command allows a user to use an ITS service directly. Use by the user can also be achieved by the user installing this ITS command in a program, with the ITS command then being carried out automatically when the program is run.

The language scope of an NC program can also advantageously have this command added to it. By way of example, the ITS command can be defined as follows:

ITS (<service>, <command>, <param1>, ..., <paramn>, <rval1>, ..., <rvaln>)

The parameters in brackets < > in the ITS command may, for example, have the following contents:
- a constant,
- a local reference, for example a user variable for CNC
- an external reference, for example a variable or constant on an ITS server, some other automation appliance, or the like,
- local or external list references to a constant,
- local or external references to data.

The parameters in brackets < > as used in the above example are defined, for example, as follows:

| | |
|---|---|
| <service> | = statement of the desired IT service, Example: SMS, EMAIL, EMS, MMS, FAX, ePS, WWW, WAP, ... |
| <command> | = statement of the desired function of the service Example: SEND, RECEIVE, WAIT, ... |
| <param1 ... n> | = parameter for a function |
| <rval1 ... n> | = return values of a function |

The number, the meaning, the format and/or the validity of parameters in the ITS command, may be defined differently by the respective <service> or its respective <command>.

Example: ITS ("SMS", "SEND", ePS_nr_von_cheffe, "no more unprocessed parts"<<machine_ID, R1)

The ITS service SMS is in this example intended to send an SMS (Short Message Service), to be precise to the telephone number which is stored on the ePS server in the external variable ePS_nr_von_cheffe with the text "no more unprocessed parts mill 03", with the text "mill 03" being taken from a local user variable "machine_ID". The acknowledgement as to whether the SMS has been sent should be stored in the local user variable R1.

The integration and execution of the ITS command need not be carried out on the automation device itself in this case, but can be carried out entirely or partially on a (possibly worldwide) central ITS server. If the ITS command contains constant or else local references, then these or their contents are transmitted, for example from the automation device, together with the ITS command to the ITS server. This allows function upgrades of an ITS user interface which, for example, are as follows: new <service>, new <command> without any need to make any changes to the automation device. If the ITS server is set up appropriately, it is also possible to define the functional scope of the ITS user interface separately for each individual automation device.

The invention advantageously allows a very wide range of advantages to be achieved, such as:
- the use of external services by NC and/or CNC programs;
- the inclusion of new and/or old external services without any change to the NC and/or CNC software;
- the linking of external services to the NC and/or CNC program; in this case, in particular, synchronization between the program and the external service is advantageous;
- the use of external services by means of a user-written NC and/or CNC program.

The invention also relates to an apparatus for carrying out at least one of the methods described above. The apparatus has at least one automation device and one communication means.

BRIEF DESCRIPTION OF THE DRAWINGS

Exemplary embodiments of the invention will be explained in the following text and are illustrated in the drawing, in which.

DETAILED DESCRIPTION OF INVENTION

Figure 1:
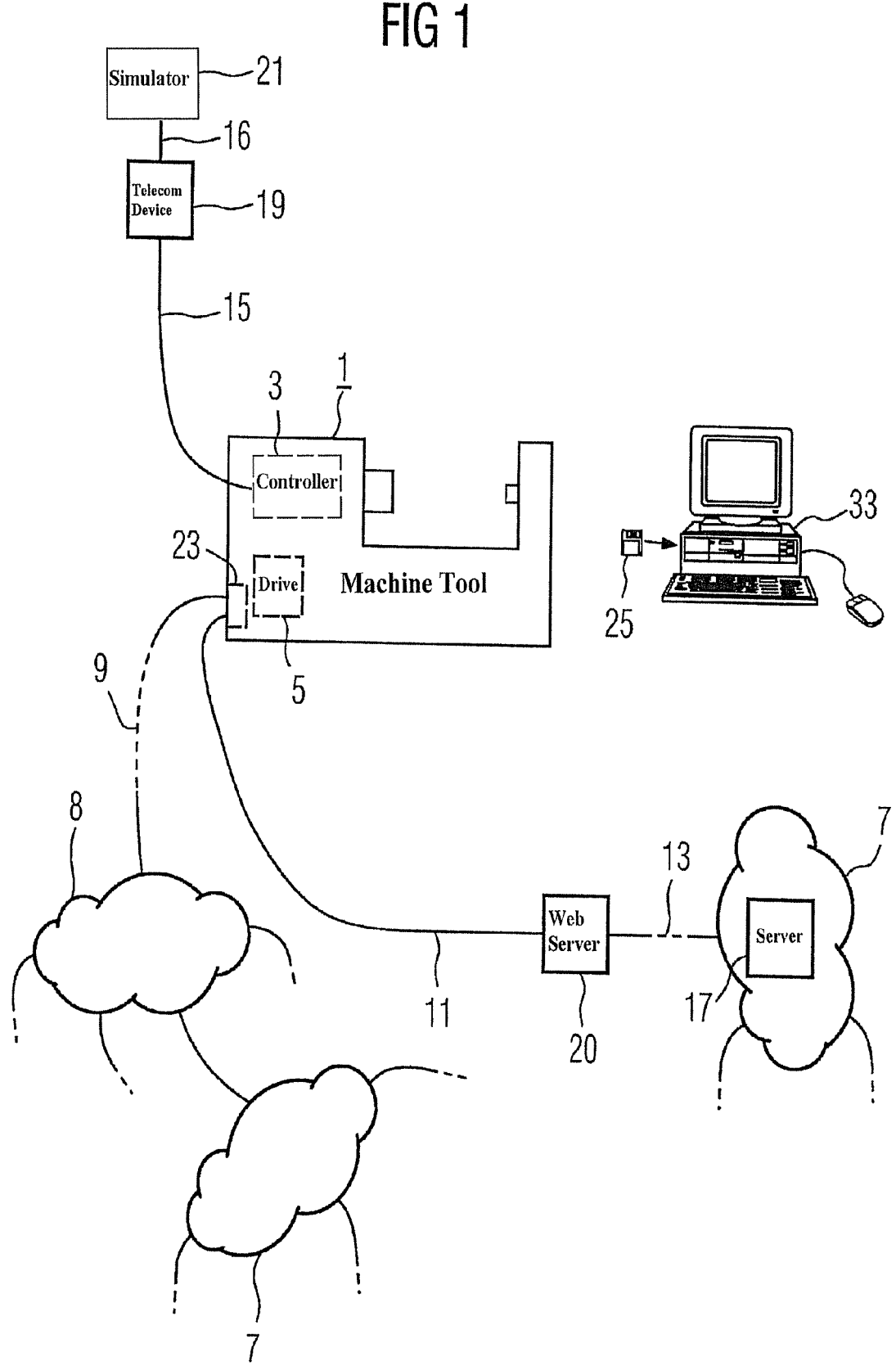
FIG. 1 shows a machine tool for carrying out the invention.

The illustration in FIG. 1 shows a machine tool 1. By way of example, the machine tool 1 has a CNC controller 3 and a drive 5. The drive 5 has a converter and an electrical machine, which are not illustrated in detail. Furthermore, the machine tool 1 has a communication interface 23. The machine tool 1 and/or the CNC controller 3 and/or the drive 3 are/is automation devices. At least one of these automation devices is able to set up a communication link 9, 11, 13, 15 with an external communication partner 7, 8, 19. This communication link 9, 11, 13, 15 is set up, for example, via the communication interface 23. By way of example, the communication interface 23 is a web server, a dialing device for a telecommunications installation, a fax modem or the like. By way of example, the communication interface 23 can also be integrated in an automation device such as a CNC controller 3. The communication links 9, 11, 13, 15 are examples of communication links which can be implemented and/or used individually or jointly. The machine tool 1 can be connected to an Intranet 8 by means of the communication link 9. The Intranet 8 is, for example, connected to an Internet 7. The machine tool is connected to a communication means 20 via the communication link 11. By way of example, the communication means 20 is a web server to which the machine tool 1 and/or an automation device integrated in it are/is connected for data purposes. By way of example, a web server is also integrated in an automation device 1, 3, 5. A link can be set up to the Internet 7 via the communication means 20, which is associated with the machine tool 1, by means of the communication link 13. By way of example, the Internet 7 has a server 17 which is provided for simulation tasks for the machine tool 1 or else for further machine tools that are not illustrated. The link between the communication means 20 and the Internet 7 is set up by means of the communication link 13. By way of example, a WLAN link can be used as the linking means. The CNC controller 3 can, for example, also be set up via the communication link 15 to a telecommunication device 19. A link to a simulator 21 can be set up by means of the telecommunication link 19. By way of example, the simulator 21 is installed at a different location from the machine tool 1. By way of example, a telephone link is used as the communication link 16. The CNC controller 3 shown in FIG. 1 can be programmed, for example, by means of an engineering system 33. The program is transmitted to the CNC controller 3, for example, by means of a data storage medium 25, or else by means of a wire-free data link.

Figure 2:
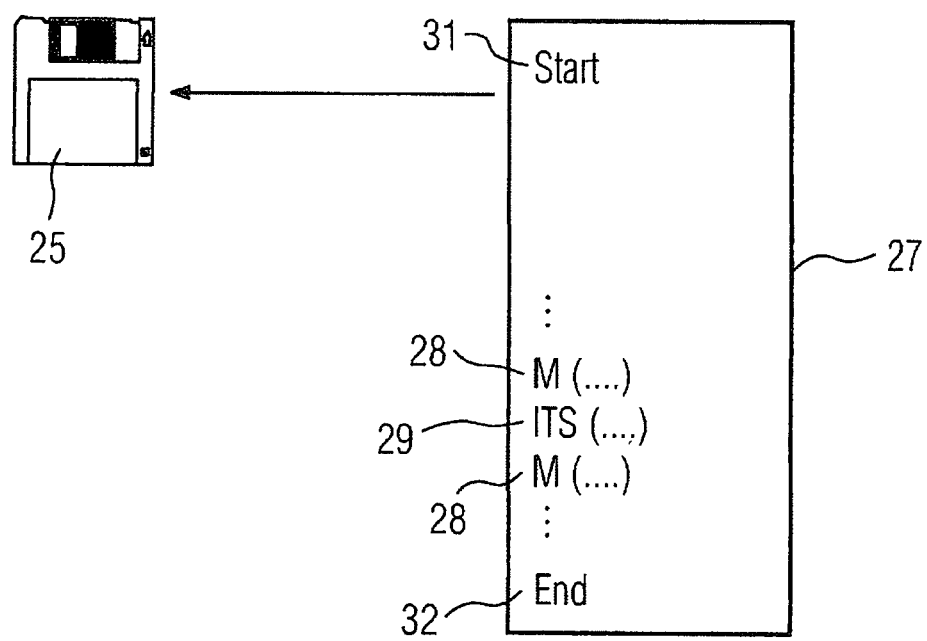
FIG. 2 shows a method example.

The illustration in FIG. 2 shows a data storage medium 25 in which a program 27 is stored. The program 27 has, for example, a start instruction 31 and an end instruction 32. By way of example, the program 27 also has instructions 28 relating to the movement of a drive. Furthermore, the program 27 has an instruction ITS 29, with this instruction (command) relating to access to an Internet or to a telecommunication service. An instruction such as this is, according to the invention, integrated in the program 27. This program 27 is advantageously a user program, which is used in particular for movement control of a machine. The program 27 is presented to the CNC controller 3 in FIG. 1, for example, in binary form.

The invention claimed is:

1. A method for operating an automation device, comprising:
   coupling the automation device to a simulator;
   controlling the automation device based upon control instructions in a part program configured to simulate fabrication of a virtual workpiece;
   setting up a communication link between the automation device and an Internet;
   providing at least one instruction within the part program to use the communication link;
   transmitting to a computer via the Internet simulation data resulting from the simulated fabrication of the virtual workpiece;
   analyzing with the computer the transmitted simulation data;
   based on results from the analyzing of the simulation data, modifying the control instructions in the part program based on communication between the automation device and the computer via the Internet; and
   controlling the automation device based upon modified control instructions in the part program to fabricate a physical workpiece.

2. The method as claimed in claim 1, wherein the automation device has a shaft, wherein movement of the shaft is determined based upon the part program.

3. The method as claimed in claim 1, wherein the automation device has a plurality of processing units that move simultaneously, wherein part programs define how processing units move for simultaneous processing.

4. The method as claimed in claim 3, wherein a part program is programmed via an engineering program.

5. The method as claimed in claim 3, wherein the automation device is a machine tool.

6. The method as claimed in claim 5, wherein a plurality of data communication types are used within one part program.

7. The method as claimed in claim 1, wherein the instruction for data communication is supplied with parameters determining a type of data communication.

8. The method as claimed in claim 1, wherein the instruction for use of the communication link is transmitted to a communication element to establish the communication link based upon the communication element.

9. The method as claimed in claim 1, wherein the computer provides simulations enabling visual assessment of multiple workpiece contours.

10. The method as claimed in claim 1, wherein the computer is at a location different than that of the automation device.

11. A method for operating an automation device, comprising:
   coupling the automation device to a simulator;
   controlling the automation device based upon control instructions in a part program yet to be released, wherein the part program comprises a sequence of simulated part program sections including at least a first simulated part program section, wherein the controlling of the automation device is based on running said at least first simulated part program section;
   setting up a communication link between the automation device and an Internet;
   providing at least one instruction within the part program to set up the communication link;
   transmitting to a computer via the Internet simulation data resulting from running said at least first simulated part program section;
   analyzing with the computer the transmitted simulation data;
   iteratively performing further controlling of the automation device based upon running further simulated part programs sections of the part program until each of the sequence of simulated part program sections has been respectively run to control the automation device and respectively analyzed with the computer; and
   based on results from the analyzing of the simulation data, modifying the control instructions in the part program based on communication between the automation device and the computer; and
   releasing the part program with the modified controls instructions as an operational part program.

* * * * *